United States Patent
Patel

(10) Patent No.: US 10,685,566 B1
(45) Date of Patent: *Jun. 16, 2020

(54) DIFFERENTIATING ROADWAYS BY ELEVATION

(71) Applicant: Waymo LLC, Mountain View, CA (US)

(72) Inventor: Nirmal Patel, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/564,941

(22) Filed: Sep. 9, 2019

Related U.S. Application Data

(63) Continuation of application No. 15/837,662, filed on Dec. 11, 2017, now Pat. No. 10,446,027.

(51) Int. Cl.
  *G08G 1/137* (2006.01)
  *G08G 1/0967* (2006.01)
  *G05D 1/00* (2006.01)

(52) U.S. Cl.
  CPC .......... *G08G 1/137* (2013.01); *G08G 1/0967* (2013.01); *G05D 1/0088* (2013.01)

(58) Field of Classification Search
  CPC ..... G08G 1/137; G08G 1/0967; G05D 1/0088
  USPC .......................................................... 340/905
  See application file for complete search history.

(56) References Cited

U.S. PATENT DOCUMENTS

| | | | |
|---|---|---|---|
| 6,175,802 B1* | 1/2001 | Okude | G01C 21/32 |
| | | | 701/431 |
| 7,672,778 B1 | 3/2010 | Elliott | |
| 8,346,426 B1 | 1/2013 | Szybalski et al. | |
| 8,489,316 B1 | 7/2013 | Hedges et al. | |
| 8,825,391 B1 | 9/2014 | Urmson et al. | |
| 9,400,183 B1 | 7/2016 | Urmson et al. | |
| 9,582,907 B1 | 2/2017 | Szybalski et al. | |
| 2003/0030546 A1 | 2/2003 | Tseng | |
| 2003/0058337 A1 | 3/2003 | Tanaka et al. | |
| 2006/0080033 A1* | 4/2006 | Komatsu | G01C 21/30 |
| | | | 701/448 |

(Continued)

OTHER PUBLICATIONS

Chen, et al., "Automatic Reconstruction of 3D Road Models by Using 2D Road Maps and Airborne Lidar Data", Center for Space and Remote Sensing Research, 2005, 6 pages.

(Continued)

*Primary Examiner* — Nay Tun
(74) *Attorney, Agent, or Firm* — Botos Churchill IP Law

(57) ABSTRACT

This technology relates to selectively providing details of surrounding roads to passengers of a vehicle. One or more computing devices may calculate a plane relative to an orientation of the vehicle based upon at least one of the vehicle's location, pitch, and yaw. For each surrounding road a distance between the surrounding road and the plane may be determined by the one or more computing devices. The one or more computing devices may generate and display a video indicating a projected trajectory of the vehicle and objects detected by sensors on the vehicle, on a map corresponding to a route the vehicle is currently following and virtual representations of surrounding roads which are within a predefined distance of the location of the vehicle based on the determined distance for each of the surrounding roads.

20 Claims, 19 Drawing Sheets

(56) References Cited

U.S. PATENT DOCUMENTS

| | | |
|---|---|---|
| 2007/0154068 A1 | 7/2007 | Stein et al. |
| 2008/0201072 A1 | 8/2008 | Adachi |
| 2009/0043489 A1 | 2/2009 | Weidner |
| 2009/0201263 A1 | 8/2009 | Hofmann |
| 2010/0204916 A1 | 8/2010 | Garin |
| 2012/0057757 A1 | 3/2012 | Oyama |
| 2012/0265437 A1 | 10/2012 | Schaminee |
| 2014/0267282 A1 | 9/2014 | Ren et al. |
| 2015/0345976 A1 | 12/2015 | Moore et al. |
| 2017/0254661 A1 | 9/2017 | Moore et al. |
| 2018/0143431 A1 | 5/2018 | Matsuura et al. |

OTHER PUBLICATIONS

Elberink, et al., "Adding the third Dimension to a Topographic Database using Airborne Laser Scanner Data", Department of Earth Observation Science, International Institute for Geo-Information Science and Earth Observation, 2005, 6 pages.

Kummerle, et al., "Autonomous Driving in a Multi-Level Parking Structure,", IEEE International Conference on Robotics and Automation, Kobe, May 12-17, 2009, pp. 3395-3400.

Triebel, et al., "Multi-Level Surface Maps for Outdoor Terrain Mapping and Loop Closing", University of Freiburg, 2005, 7 pages.

\* cited by examiner

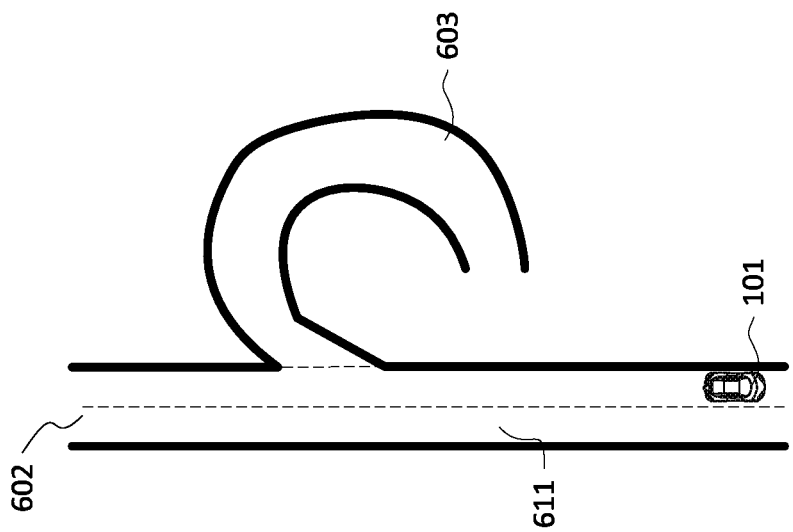
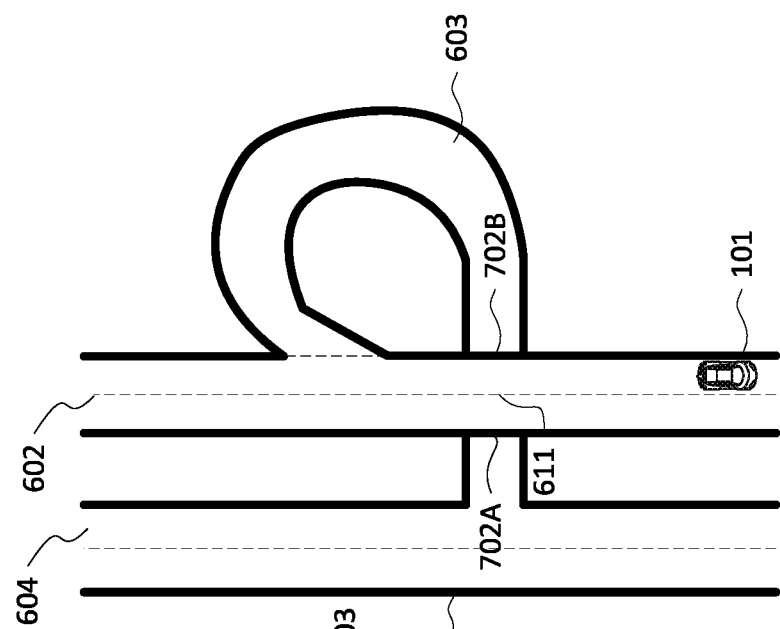
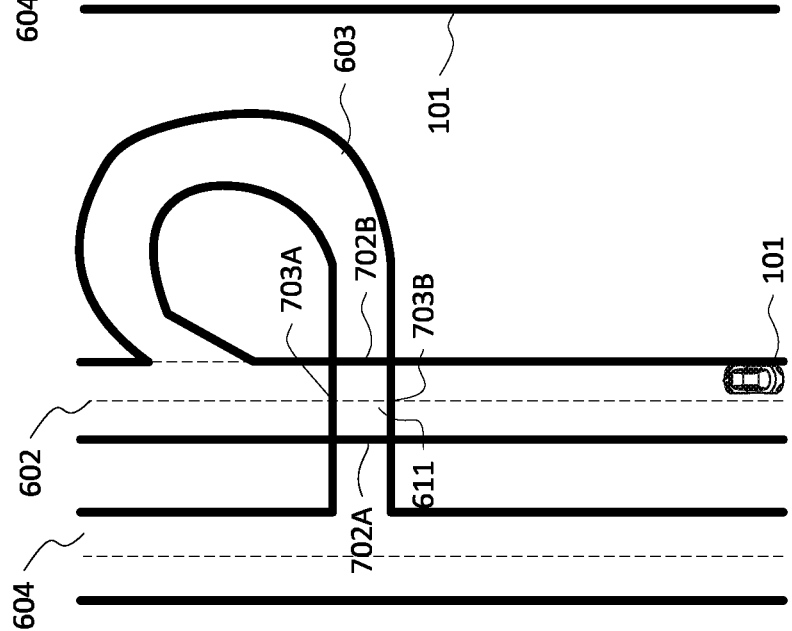
FIGURE 8A
FIGURE 8B
FIGURE 8C

DIFFERENTIATING ROADWAYS BY ELEVATION

CROSS REFERENCE TO RELATED APPLICATIONS

The present application is a continuation of U.S. patent application Ser. No. 15/837,662, filed Dec. 11, 2017, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers or a remote operator may provide some initial input, such as a pickup or destination location, and the vehicle maneuvers itself to that location.

Such vehicles are typically equipped with various types of sensors in order to detect objects in the surroundings. For example, autonomous vehicles may include lasers, sonar, radar, cameras, and other devices which scan and record data from the vehicle's surroundings. Sensor data from one or more of these devices may be used to detect objects and their respective characteristics (position, shape, heading, speed, etc.).

These characteristics can be used to provide to occupants of the vehicle a visual indication of objects detected in the vicinity of a vehicle as well as what those objects are likely to do for some brief period into the future. For instance, a display in the vehicle may present a video generated by a video display system from the perspective of a virtual camera fixed relative to the vehicle at a default position. The video may include imagery within a set field of view corresponding to the position of the virtual camera including a portion of the vehicle's surroundings and the vehicle's projected trajectory.

In addition, messages may be overlaid on the video to inform passengers of the vehicle's actions and information regarding the vehicle's route. For instance, the display may include messages overlaid on the video regarding the vehicle's speed, a map of the area in the vehicle's vicinity, and the speed limit of the street the vehicle is travelling upon.

BRIEF SUMMARY

Embodiments within the disclosure relate generally to selectively providing details of surrounding roads to passengers of a vehicle. In one embodiment one or more computing devices may compute a plane relative to an orientation of the vehicle based upon at least one of the vehicle's location, pitch, and yaw. The one or more computing devices may determine, for each surrounding road a distance between the surrounding roadway and the plane and generate and display a video indicating a projected trajectory of the vehicle and objects detected by sensors on the vehicle, on a map corresponding to a route the vehicle is currently following and virtual representations of surrounding roads which are within a predefined distance of the location of the vehicle based on the determined distance for each of the surrounding roads.

In some instances, calculating the plane includes determining a vector normal to the plane based on the vehicle's location, pitch, and yaw. In some instances, determining for each surrounding road the distance between the surrounding road and the plane includes: separating the surrounding road into portions, and determining the distance between the plane and at least one location coordinate within each portion of the road. Generating and displaying, virtual representations of surrounding road which are within a predefined distance of the location of the vehicle may include displaying portions of the surrounding road where the portions of the surrounding road are within the predefined distance. In some instances the predefined distance is no more than 3 meters.

In some instances, the virtual representations of surrounding roads which are outside of the predefined distance are removed from the display.

In some instances the distance between the surrounding road and the plane is defined as an angular displacement. The angular displacement may be the angle between a vector from a point on the plane to a location coordinate of the surrounding road and the plane. In some instances the predefined distance is no more than 5 degrees.

In some instances, the predefined distance is varies based upon the distance of the surrounding road to the vehicle.

Another aspect of the disclosure relates to a system for selectively providing details of surrounding roads to passengers of a vehicle, the system comprising one or more processors configured to: calculate a plane relative to an orientation of the vehicle based upon at least one of the vehicle's location, pitch, and yaw; determine, for each surrounding road, a distance between the surrounding road and the plane; and generate and display a video indicating a projected trajectory of the vehicle and objects detected by sensors on the vehicle, on a map corresponding to a route the vehicle is currently following and virtual representations of surrounding road which are within a predefined distance of the location of the vehicle based on the determined distance for each of the surrounding roads.

BRIEF DESCRIPTION OF THE DRAWINGS

FIGS. 8A-8C are illustrations of selectively removing portions of roads in accordance with aspects of the disclosure.

DETAILED DESCRIPTION

Overview

Figure 1:
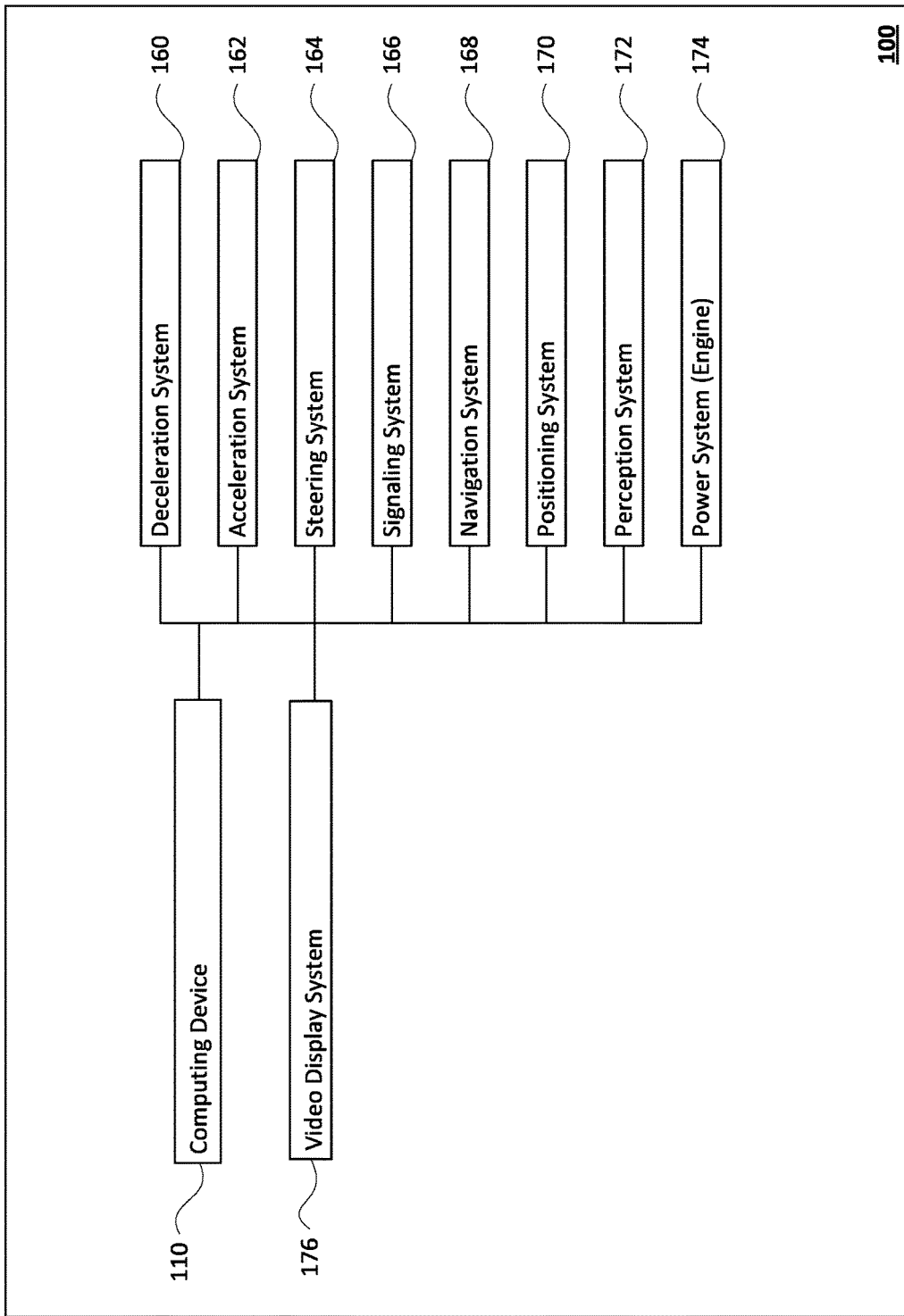
FIG. 1 is a functional diagram of an example vehicle in accordance with an exemplary embodiment.
Figure 2:
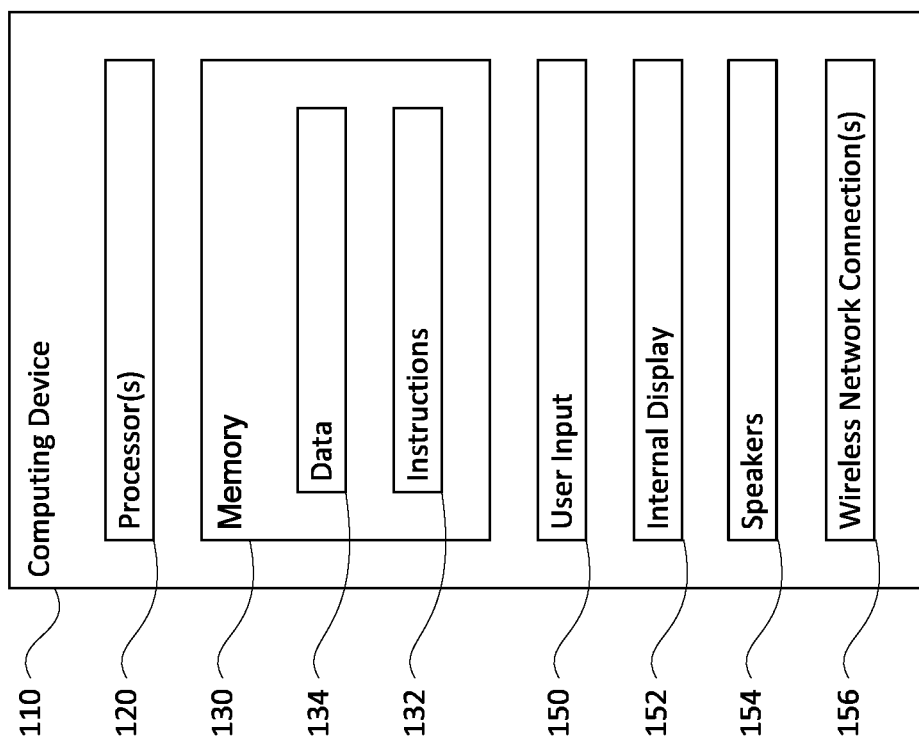
FIG. 2 is a functional diagram of an example system in accordance with an exemplary embodiment.

The technology relates to providing information to passengers of vehicles operating autonomously about the vehicle's environment. This may include continually displaying a road a vehicle is travelling upon while selectively removing portions of other roads which are on a different plane than the vehicle is travelling upon. In one configuration, a representation of the vehicle's environment may be presented as a video generated on a display in a vehicle using the perspective of a virtual camera fixed relative to the vehicle at a default position on a display in a vehicle. The video may include imagery within a set field of view of the vehicle's environment corresponding to the position of the virtual camera including a portion of the vehicle's surroundings, such as the road upon which the vehicle is travelling and surrounding roads, and the vehicle's projected trajectory. In the event a road travels above or below another, the video will provide imagery such that the road the vehicle is travelling upon intersects with the road which crosses above or below the intersecting road. However, this imagery may be confusing or even alarming to passengers of the vehicle, as it may appear that the vehicle is moving towards and about to run through an intersection or about to hit a structure at the edge of the surrounding road. Moreover, when all surrounding roads are shown, passengers may be overwhelmed with details.

To address this, the video may be updated such that the portion of the intersecting road which goes over or under the road upon which the vehicle is travelling is faded out or not displayed. The video may also be updated such that roads or portions of roads which are more than a predetermined distance from an elevation the vehicle is currently travelling may be removed. For example, upon the vehicle approaching an intersecting road, the portion of the intersecting road which crosses above or below the road upon which the vehicle is travelling may be removed from the video.

The video display system may continually monitor the received data to calculate a plane relative to the vehicle's position. In this regard, the video display system may continually calculate a plane based upon the vehicle's location, as well as the vehicle's pitch and yaw vectors, as received from the vehicle's positioning system. The plane may be centered on the vehicle or a portion of the road on which the vehicle is currently positioned.

The video display system may take received coordinates of the road where vehicle is positioned and the coordinates of an intersecting road at, or near a point of intersection in order to determine distances of the respective coordinates from the calculated plane. Based on the distances, the closer road may be selected for display in the video. The more distant road may be faded or removed from the video The video display system may determine sections of roads which are on, or near, the same plane as the vehicle. For instance, for every section of road, such as 1 m, or more or less, a determination of the distance of the respective section of road from the plane may be determined. Sections of the road which are more than a predetermined threshold distance from the plane, such as 3 meters, or more or less, may be removed from the video.

The distance of respective coordinates from the plane of the vehicle may be calculated by angular displacement. In this regard, the video display system may calculate angles from a point on the plane at the vehicle's location to the respective coordinates of each road. The road with coordinates associated with the smallest angle may be displayed in the video while the other roads may be faded out or removed from the video.

The video display system may continually calculate the distance of surrounding roads relative to the plane of the vehicle. As the vehicle continues along its trajectory, the video display system may continually monitor the distance of surrounding roads relative to the plane of the vehicle and update the video as roads and portions of roads move above or below the predetermined threshold distances.

The features described above may allow a vehicle, such as an autonomous vehicle, to provide video of the vehicle's trajectory and surroundings to its passenger. By selectively displaying roads relative to the vehicle, the passengers are provided with an informative and natural view of their surroundings. Moreover, the imagery provided to the passengers may prevent alarming passengers, as portions or all of the road which pass over or under the road upon which the vehicle is travelling may be removed from the video.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal display 152 as well as one or more speakers 154 to provide information or audio visual experiences. In this regard, the display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle. For example, returning to FIG. 1, computing device 110 may be in communication with various systems of vehicle 100, such as deceleration system 160, acceleration system 162, steering system 164, signaling system 166, navigation system 168, positioning system 170, perception system 172, and video display system 176 in order to control the movement, acceleration, speed, operation, communicate information to passenger of the vehicle, etc. of vehicle 100 in accordance with the instructions 132 of memory 130. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed and acceleration of the vehicle. For example, the acceleration system 162 may provide signals to the engine 174 to accelerate at a particular rate. Similarly, steering system 164 may be used by computing device 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store detailed map information, e.g., highly detailed maps identifying the shape and elevation of roads, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roads Positioning system 170 may be used by computing device 110 in order to determine the vehicle's relative or absolute position on a map or on the earth. For example, the positioning system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 172 also includes one or more components for detecting objects external to the vehicle such as other vehicles, obstacles in the road, traffic signals, signs, trees, etc. For example, the perception system 172 may include lasers, sonar, radar, cameras and/or any other detection devices that record data which may be processed by computing device 110. In the case where the vehicle is a small passenger vehicle such as a car, the car may include a laser or other sensors mounted on the roof or other convenient location. For instance, a vehicle's perception system may use various sensors, such as LIDAR, sonar, radar, cameras, etc. to detect objects and their characteristics such as location, orientation, size, shape, type, direction and speed of movement, etc. The raw data from the sensors and/or the aforementioned characteristics can be quantified or arranged into a descriptive function or vector for processing by the computing device 110. As discussed in further detail below, computing device 110 may use the positioning system 170 to determine the vehicle's location and perception system 172 to detect and respond to objects when needed to reach the location safely.

The computing device 110 may control the direction and speed of the vehicle by controlling various components. By way of example, computing device 110 may navigate the vehicle to a destination location completely autonomously using data from the detailed map information and navigation system 168. In order to maneuver the vehicle, computing device 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between a power system 174 (for instance, a gas or electric engine) of the vehicle and the wheels of the vehicle. Again, by controlling these systems, computing device 110 may also control the drivetrain of the vehicle in order to maneuver the vehicle autonomously.

The video display system 176 may monitor data from the systems of the vehicle to generate a video of the vehicle's surroundings for display in the vehicle. In this regard, the video display system 176 may monitor system data generated by the other computing devices regarding the vehicle's operation including data representing the vehicle's past, present, and future operation. The vehicle display system may also monitor messages sent to and from the vehicle's computing device 110, which is in communication with the different systems and computing devices of the vehicle. For instance, the video display system may aggregate data from the vehicle's perception system 172, such as objects external to the vehicle within a particular range, data from the positioning system 170, such as the vehicle's current location, and data from the navigation system 168, such as the vehicle's projected trajectory and map information, as described above.

The video display system 176 may take the monitored data and messages and generate a video of the vehicle's surroundings and the vehicle's projected trajectory. In this regard, the video may include imagery within a set field of view corresponding to the position of a virtual camera including a portion of the vehicle's surroundings and the vehicle's projected trajectory. In this regard, the video display system 176 may overlay the vehicle's projected trajectory and detected objects on a map corresponding to the route the vehicle is traveling. The video generated by the video display system 176 may be presented to the vehicle's passengers, other individuals, or recorded for future viewing, such as on a display in the vehicle.

The video display system may include some or all of the components of the computing device 110 as described herein, such as processor 120, memory 130, data 134, instructions 132, wireless network connections 156, speakers 154, and display 152. Likewise, in addition to, or alternatively to the functions of the video display system described herein, the video display system may perform the functions of a computing device 110. In this regard, the video display system may communicate with the various systems of the vehicle, such as systems 160-174. In some instances, the video display system may utilize components of the computing device, such as display 152 and speakers 154.

FIGS. 3A-3D are example, external views of a first configuration for vehicle 100. As can be seen in these figures, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166.

Vehicle 100 also includes sensors of the perception system 172. For example, housing 314 may include one or more laser devices for having 360 degree or narrower fields of view and one or more camera devices. Housings 316 and 318 may include, for example, one or more radar and/or sonar devices. The devices of the perception system may also be incorporated into the typical vehicle components, such as taillights/turn signal lights 304 and/or side view mirrors 308. Each of these radar, camera, and lasers devices may be associated with processing components which process data from these devices as part of the perception system 172 and provide sensor data to the planner system 102.

Figure 3A:
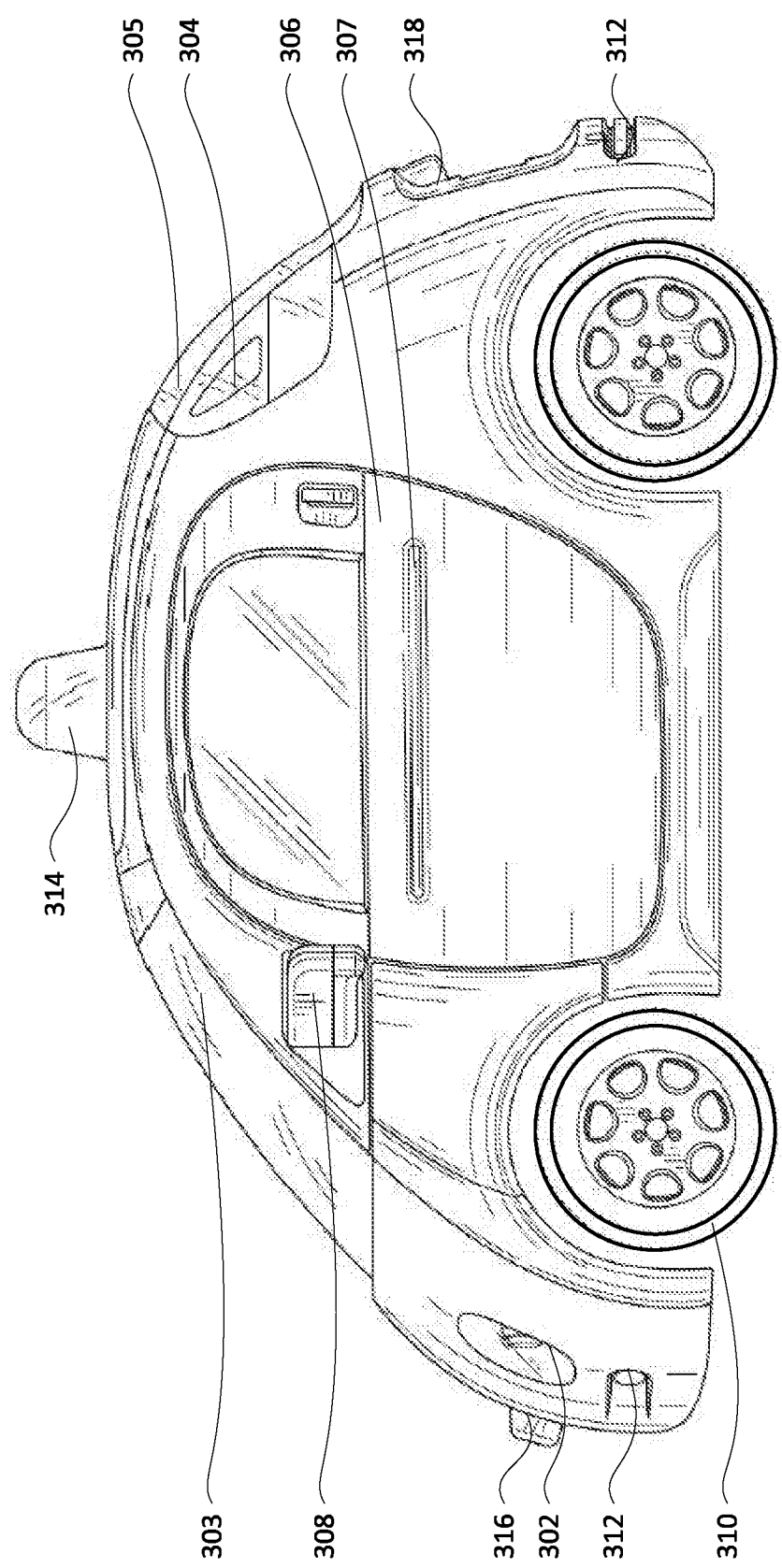
FIGS. 3A-3D are example external views of a vehicle in accordance with aspects of the disclosure.
Figure 3C:
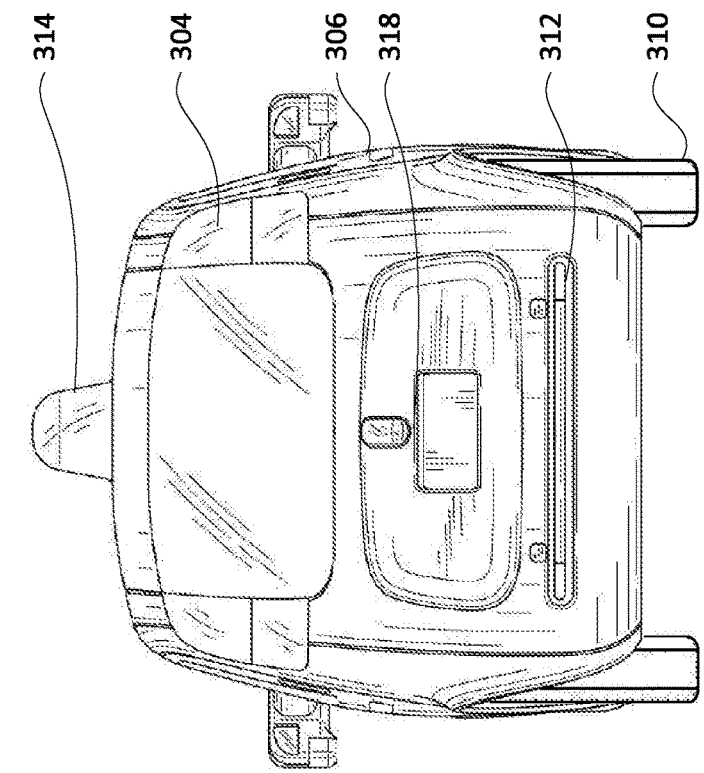
Figure 3B:
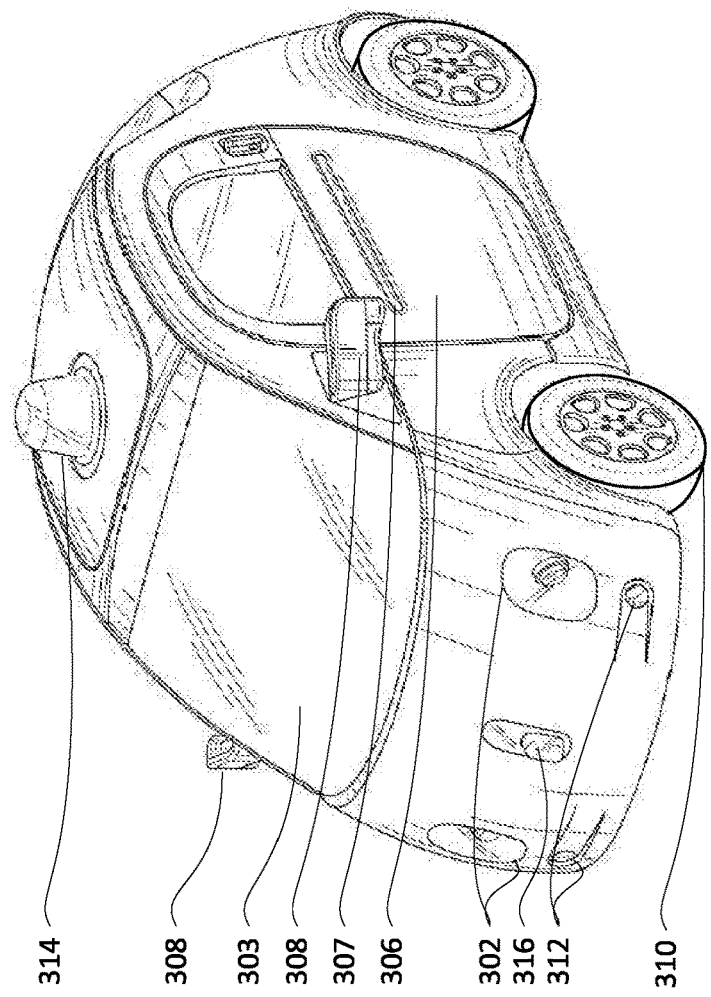
Figure 3D:
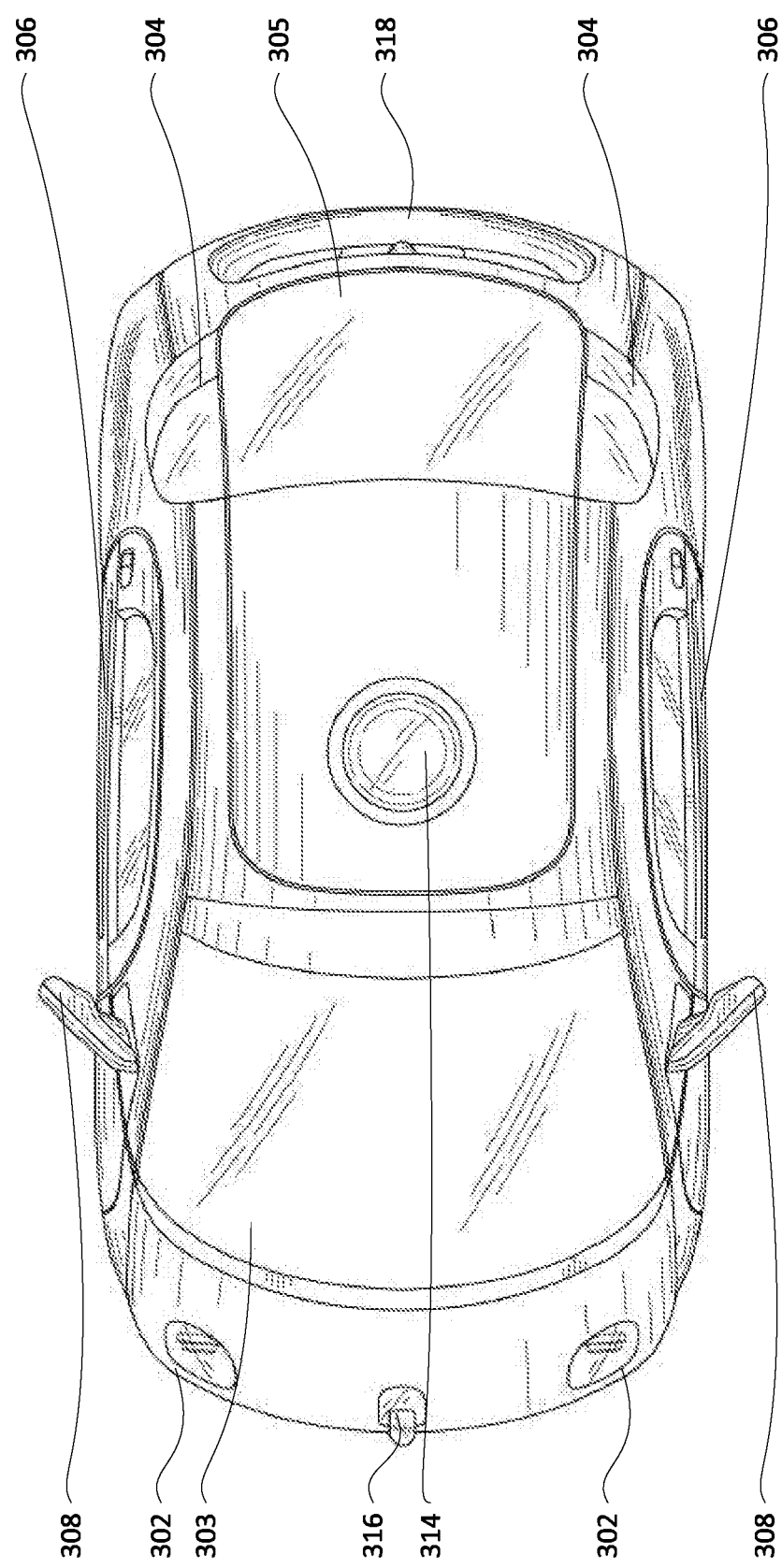
Figure 3E:
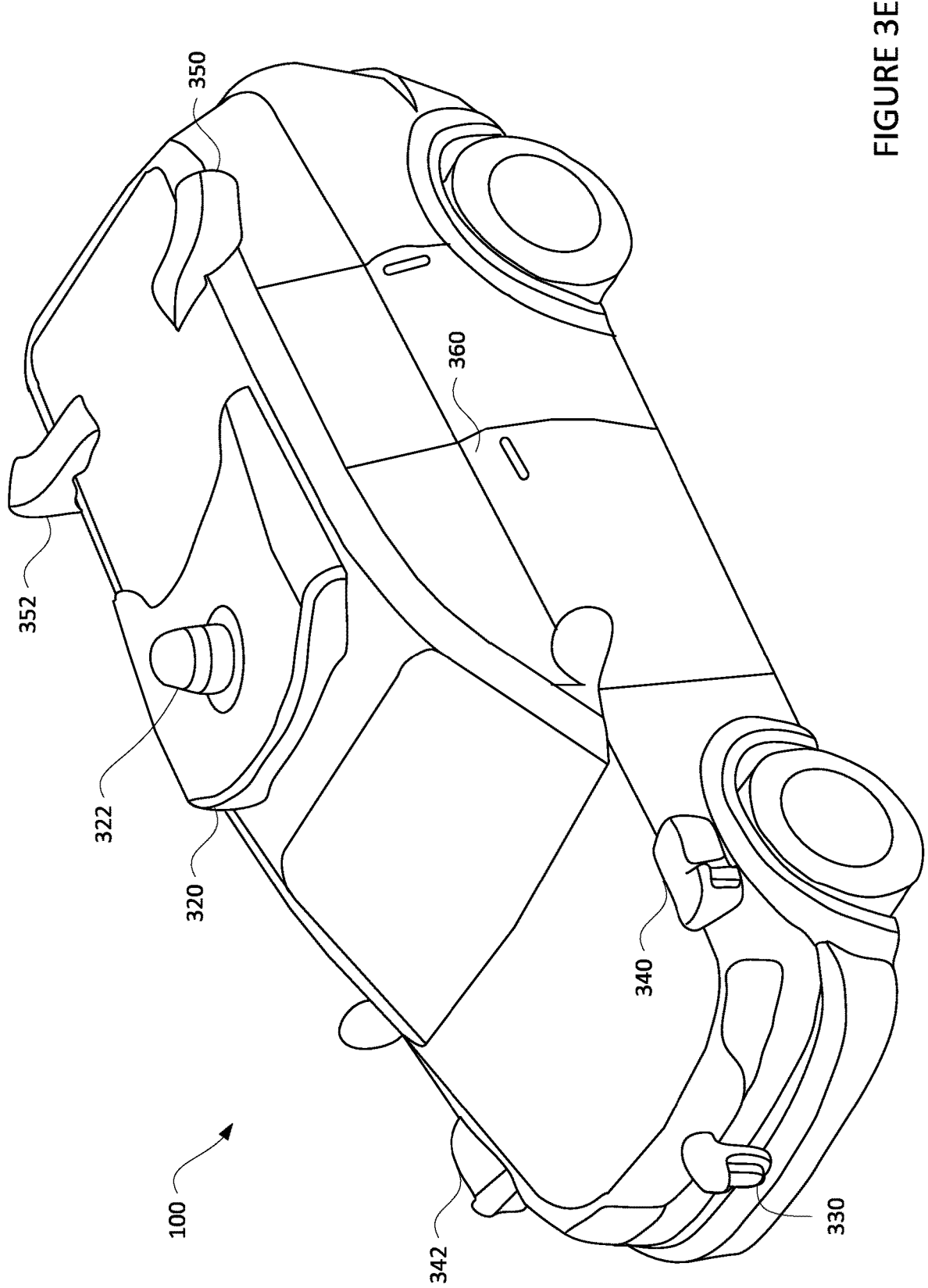
FIG. 3E is an example external view of a vehicle in accordance with aspects of the disclosure.

FIG. 3E is a second example configuration for vehicle 100. In this example, roof-top housing 320 and dome housing 322 may include a lidar sensor as well as various cameras and radar units. In addition, housing 330 located at the front end of vehicle 100 and housings 340, 342 on the driver's and passenger's sides of the vehicle may each store a lidar sensor. For example, housing 340 is located in front of driver door 360. Vehicle 100 also includes housings 350, 352 for radar units and/or cameras also located on the roof of vehicle 100. Additional radar units and cameras (not shown) may be located at the front and rear ends of vehicle 100 and/or on other positions along the roof or roof-top housing 320.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing.

Figure 4:
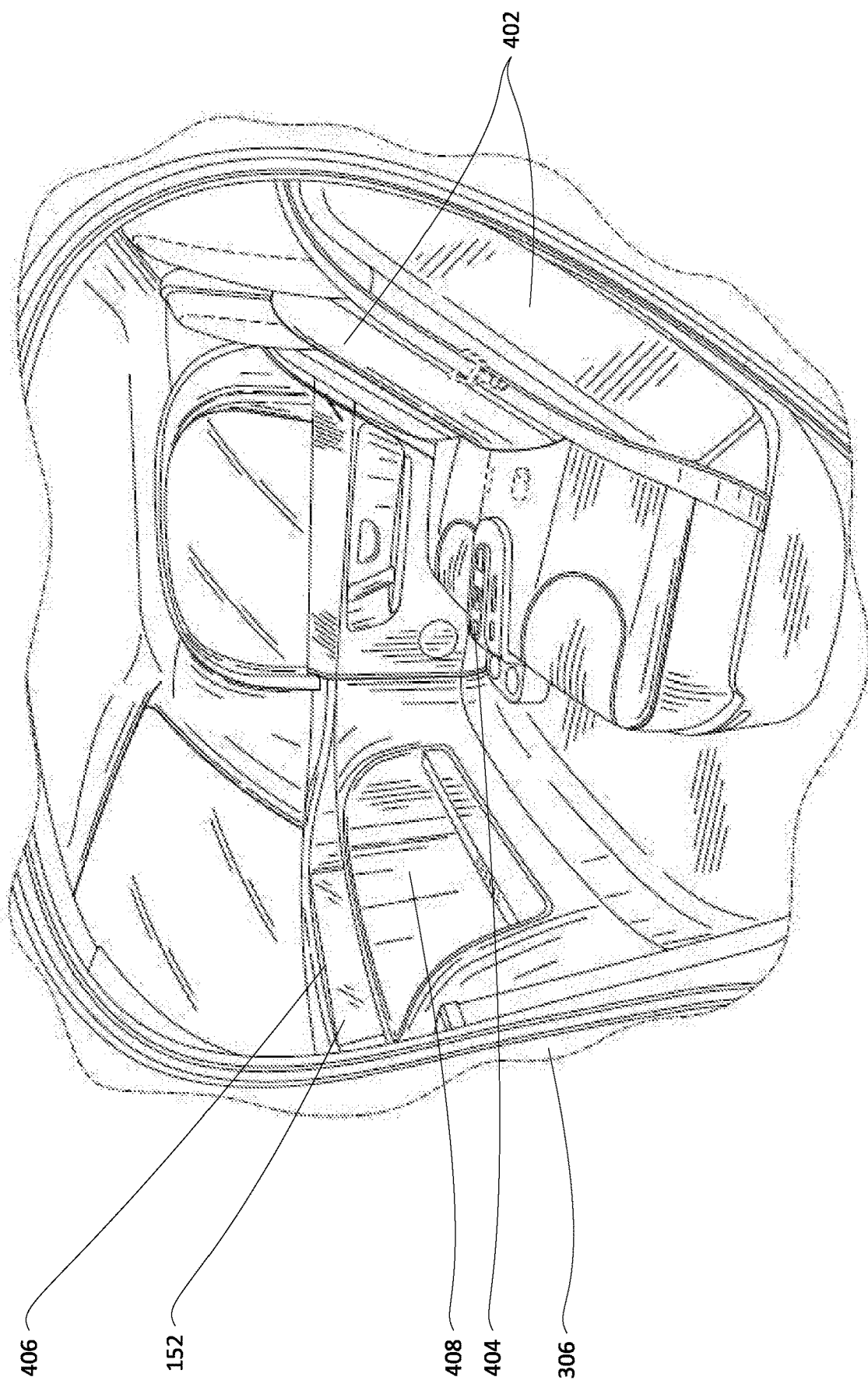
FIG. 4 is an example interval view of a vehicle in accordance with aspects of the disclosure.

FIG. 4 is an example internal view of vehicle 100 through the opening of door 306. In this example, there are two seats 402 for passengers with a console 404 between them. Directly in ahead of the seats 402 is a dashboard configuration 406 having a storage bin area 408 and the display 152. As can be readily seen, vehicle 100 does not include a steering wheel, gas (acceleration) pedal, or brake (deceleration) pedal which would allow for a semi-autonomous or manual driving mode where a passenger would directly control the steering, acceleration and/or deceleration of the vehicle via the drivetrain. Rather, user input is limited to a microphone of the user input 150 (not shown), features of the console 404, and wireless network connections 156. In this regard, display 152 merely provides information to the passenger and need not include a touch screen or other interface for user input. In other embodiments, the display 152 may include a touch screen or other user input device for entering information by a passenger such as a destination, etc.

Vehicle 100 may also include sensors of the perception system 172. For example, housing 214 may include one or more laser devices for having 360 degree or narrower fields of view and one or more camera devices. Housings 216 and 218 may include, for example, one or more radar and/or sonar devices. The devices of the perception system 172 may also be incorporated into the typical vehicle components, such as taillights/turn signal lights 204 and/or side view mirrors 208. Each of these radar, camera, and lasers devices may be associated with processing components which process data from these devices as part of the perception system 172 and provide sensor data to the computing device 110.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As described above, the video display system 176 may receive information in order to generate video. In this regard, as the vehicle carries passengers on a trip to a destination, the vehicle's video display system may monitor system data generated by the other computing devices regarding the vehicle's operation including data generated by the vehicle's navigation system, positioning system, and perception system. For instance, the data received by the video display system 176 may include objects external to the vehicle within a particular range from the vehicle's perception system 172, data from the positioning system 170, such as the vehicle's current location, such as location coordinates, and data from the navigation system 168, such as the vehicle's projected trajectory and map information. The video may be a plurality of still images or frames displayed in sequence. In some instances, the video may include animations, illustrations, live-action, and/or other such content typically found in videos, etc. For instance, the video may actual imagery captured from the vehicle's surroundings in combination with generated virtual imagery.

Figure 5A:
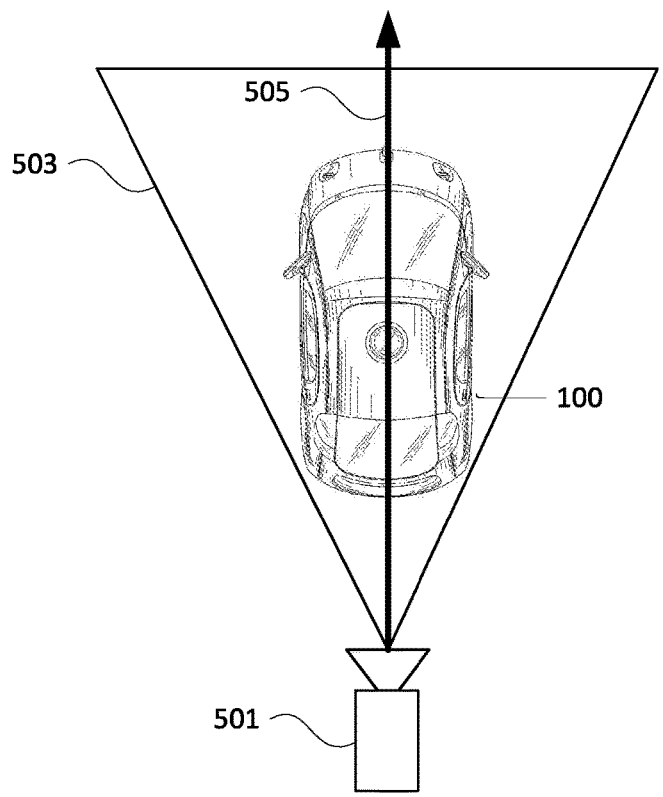
FIGS. 5A and 5B are illustrations of a virtual camera positioned at a default position in accordance with aspects of the disclosure.
Figure 5B:
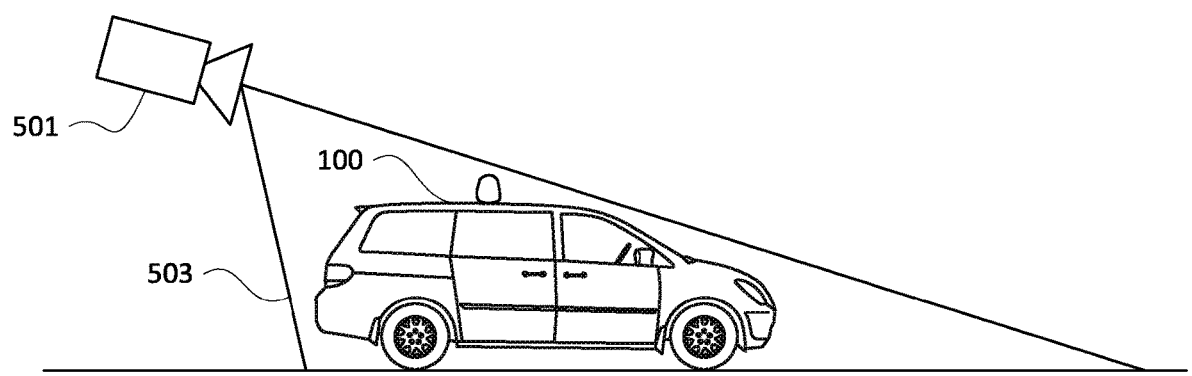

Based on the received data, a video may be generated for display on a display in the vehicle for viewing by the vehicle's passengers. The video display system may generate the video from a perspective of a virtual camera using the received data by overlaying the vehicle's projected trajectory and detected objects on a map corresponding to the route the vehicle is traveling. The perspective of a virtual camera may be fixed relative to the vehicle at a default position. For instance, as shown in FIGS. 5A and 5B, this default position of the fixed position virtual camera 501 may be above and to the rear of the vehicle 100 and directed in a first heading 505. The video may include imagery within a set field of view 503 corresponding to the first heading 505 and position of the fixed position virtual camera 501. The video display system may update the video in substantially real-time by continually updating the vehicle's projected trajectory and detected objects on the map based on received data from the perspective of the virtual camera.

Figure 6:
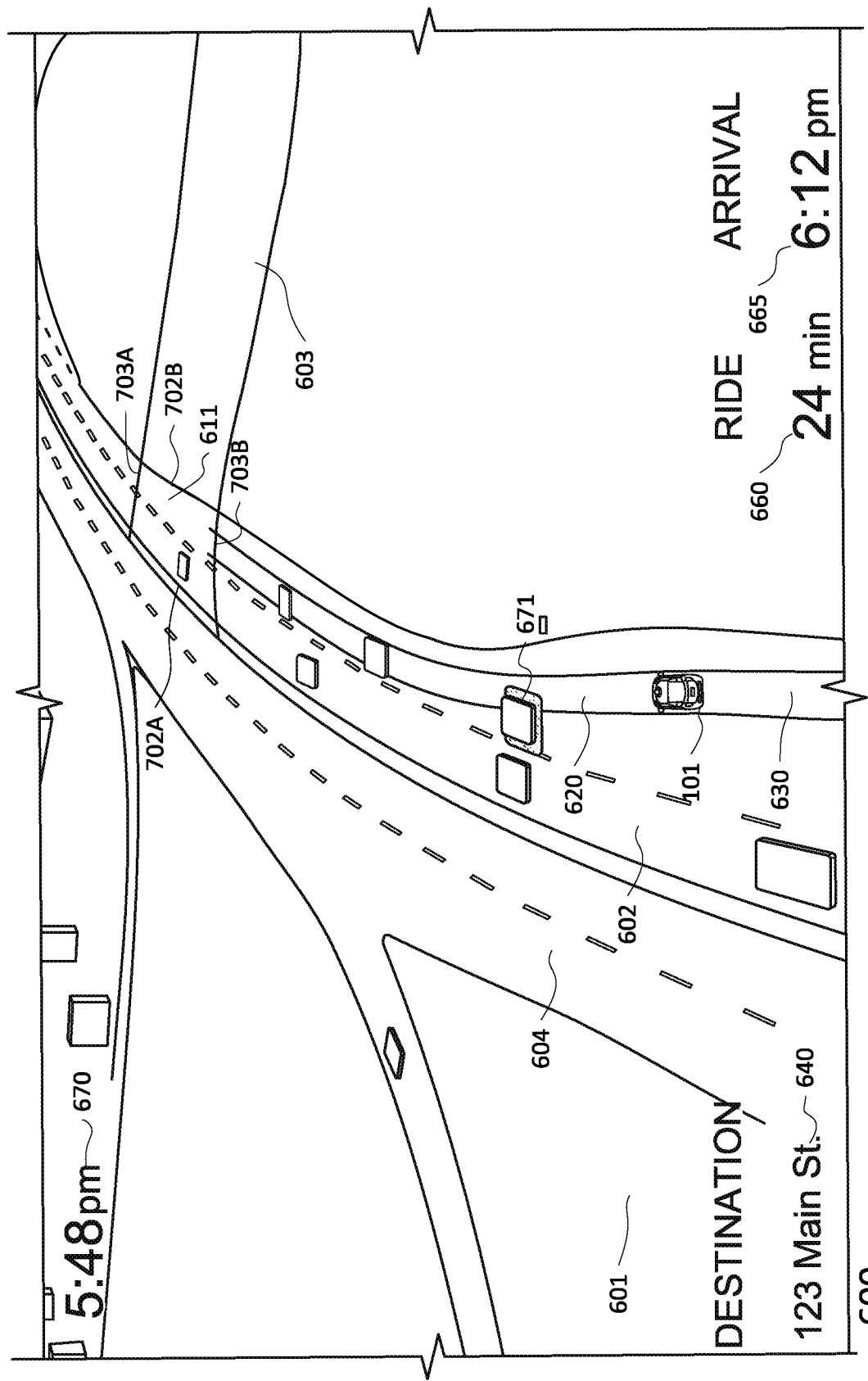
FIG. 6 is an illustration of a video frame showing a field of view of a virtual camera in accordance with aspects of the disclosure.

FIG. 6 is an example frame of a video generated by the video display system from the perspective of a virtual camera positioned in the default position above and behind the vehicle. A frame 600 of the video containing a map 601 presented within a set field of view 503 of the virtual camera. The video further includes a virtual representation of the vehicle 100 depicted as virtual vehicle 101 as well as the vehicle's surroundings, such as nearby vehicles 670, and other such surroundings. These are overlaid on the map 601 received from the navigation and perception systems 168 and 172. The map 601 may include roads and/or roadways (used interchangeably herein), such as roads 602-604, and intersection 611. The location of the virtual vehicle 101 may be determined based on information received by the video display system 176 from the vehicle's position system. The vehicle's projected trajectory 620 and past route 630, received from the positioning system 170 and/or navigation system 168 are also overlaid on the map 601.

Additional messages, such as the current time 670, the destination 640, the time progress of the trip 660, and the estimated time to arrival 665 may also be overlaid on the video. Such additional messages may be generated by the vehicle's computing device 110 based on information received by the vehicle's other systems, such as systems 160-174, and providing to the video display system 176 in order to generate the video. The video may also include animations, illustrations, live-action, and/or other such content typically found in videos.

In the event a road is located above or below another road (i.e., intersects), the video may provide imagery such that the two roads appear to intersect even though the two roads are actually spaced apart from one another vertically. For instance, as shown in FIG. 6, although road 602 passes above road 603, the video shows roads 602 and 603 as an intersection 611. In this regard, there is no differentiation between the different elevation levels of road 602 and 603.

Figure 7:
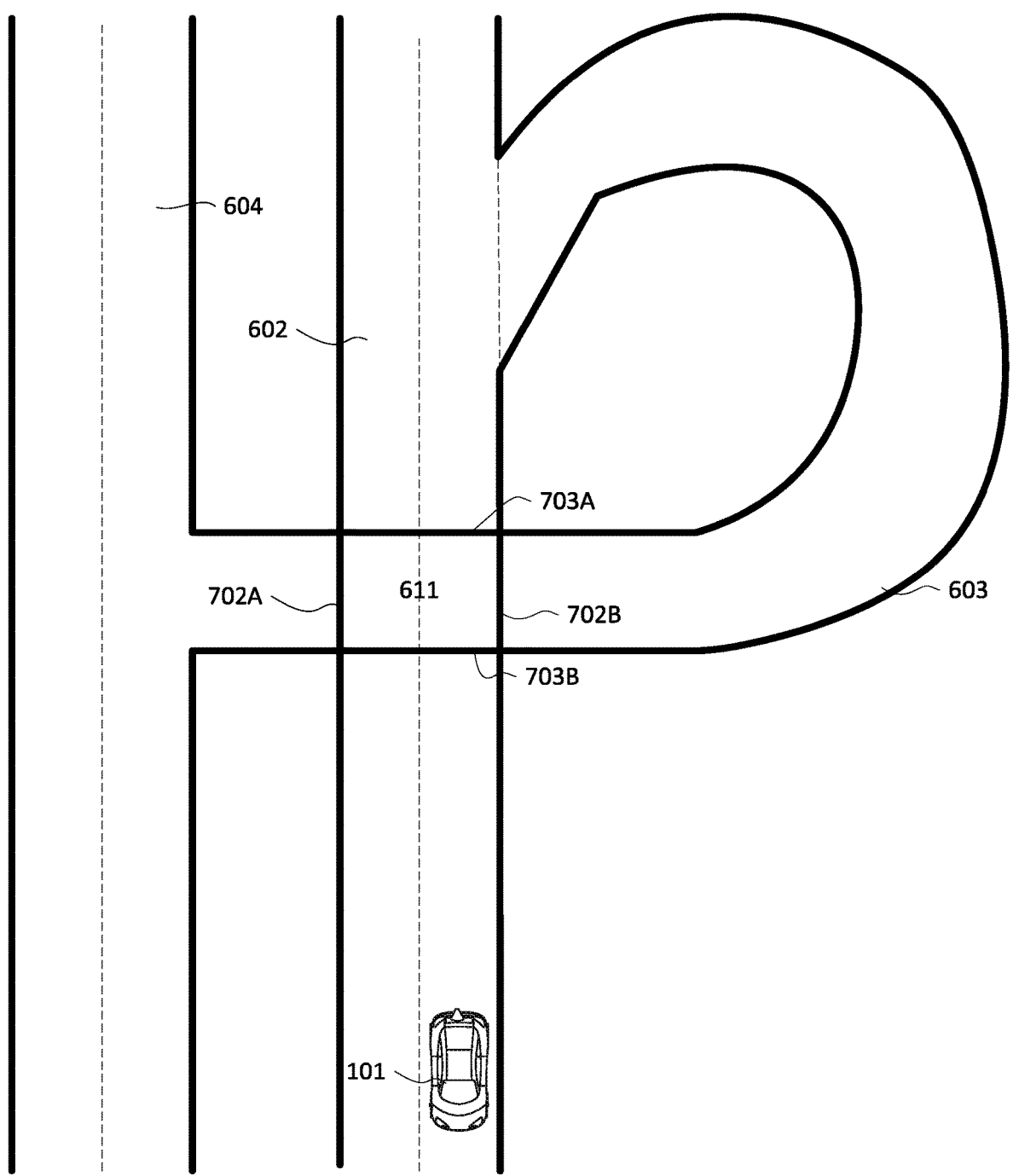
FIG. 7 is a top down view of intersecting roads in accordance with aspects of the disclosure.

A top down representation of the video frame 600 is illustrated in FIG. 7. In this regard, roadways 602 and 603 are shown as intersecting at intersection 611, with road 603 proceeding to connect with road 604. Although road 603 passes above road 602, the portion of road 603 which passes above road 602 is presented as intersection 611 in the video. In this regard, portions of road 603, including portions 703A and 703B, appear to block or cross road 602, while portions of road 602, including portions 702A and 702B, appear to block or cross road 603. Such imagery may be confusing or even alarming to passengers of the vehicle, as it may appear that the vehicle is moving towards and about to run through an intersection or about to hit a structure where the respective road portions are illustrated as crossing.

To address the potential for confusion and alleviate any alarm, the video may be updated such that the portion of the road which intersects (i.e., goes over or under) the road upon which the vehicle is travelling may be faded out or not displayed. For example, as illustrated in FIG. 8B, the video may be updated such that portions of road 603 are removed from the video, or not generated for display, as the vehicle approaches the locations where road 603 passes over road 602. In this regard, FIG. 8A shows virtual vehicle 101 travelling on road 602, while roads all roads in the vehicle's vicinity, including roads 604 and 603 are also illustrated. Upon the vehicle approaching the location where road 603 passes above road 602 (i.e., at intersection 611) the portions of road 603 which appeared to block or cross road 602 (i.e., portions 703A and 703B) may be removed, as shown in 8B. Portions of road 602 on which the vehicle is travelling, including portions 702A and 702B, remain, as further shown in FIG. 8B. In some instances, the portion of the intersecting road may simply disappear or fade over a brief period of time from the video as the vehicle approaches the location of the intersection. The determination of which portions of road to remove or fade may be based upon the portions' respective distances from the elevation of the vehicle, as described further herein.

The video may be updated such that portions of roads, or entire roads, which are more than a predetermined distance from an elevation the vehicle is currently travelling at may be removed. For instance, as illustrated in FIG. 8C, upon virtual vehicle 101 approaching the intersection 611 point of roads 602 and 603, road 604 and portions of road 603, which are more than a predetermined distance above the elevation the vehicle is currently travelling, are removed from the video. Although FIG. 8C illustrates removing roads and portions of roads which are a predetermined distance above an elevation the vehicle is currently travelling, the video display may remove or fade roads and portions of roads which are a predetermined distance below the elevation the vehicle is currently travelling.

Figure 9:
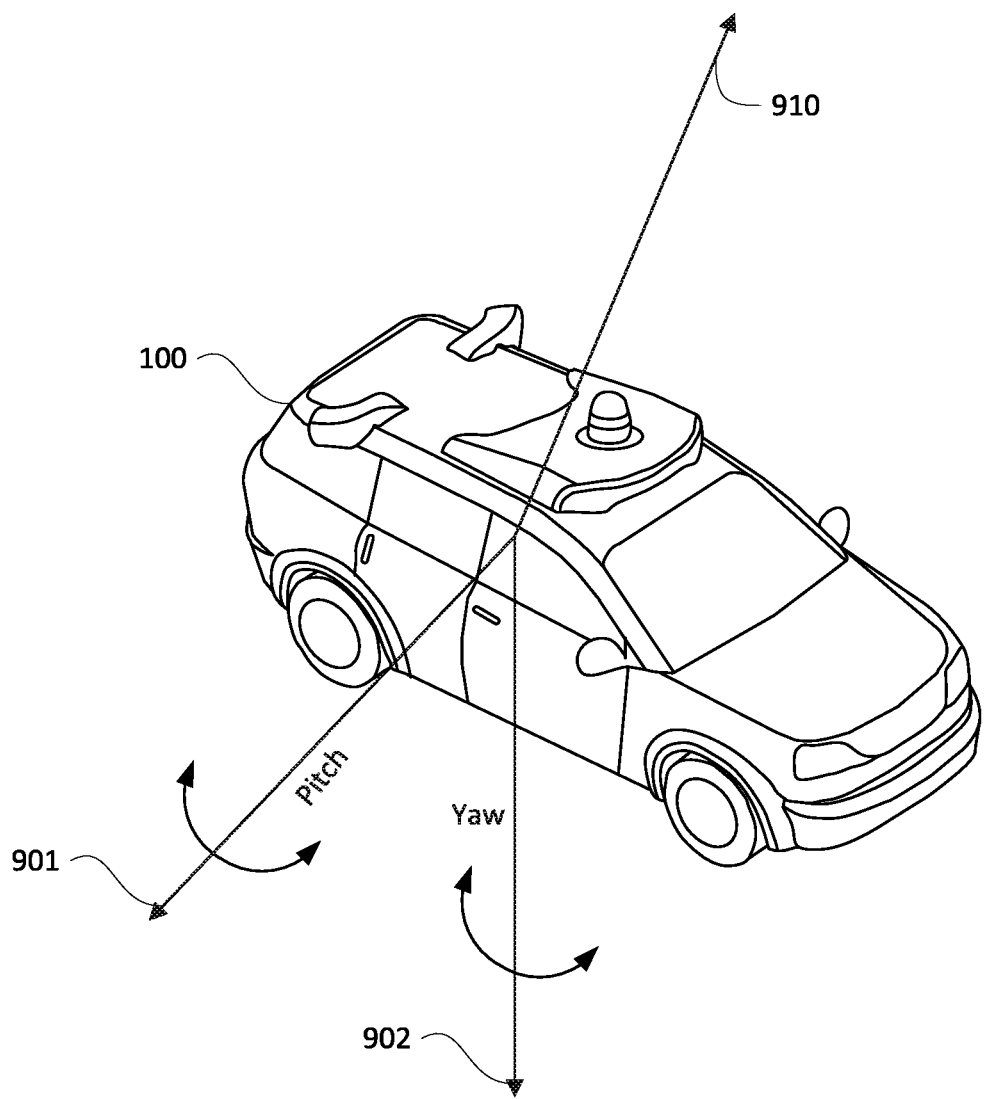
FIG. 9 is an illustration of yaw and pitch axis in accordance with aspects of the disclosure.

In order determine elevations of roads relative to the elevation of the portion of road the vehicle is currently travelling upon, the video display system 176 may monitor data, such as messages between the vehicle's planner system 102 and the vehicle's navigation and positioning systems 168 and 170, to calculate a plane relative to the vehicle's position. In this regard, the plane may be based upon the vehicle's location, as well as the vehicle's pitch and yaw. For example, as shown in FIG. 9, the pitch and raw may be based on the amount of rotation of the vehicle 100 relative to a horizontal axis 901 and vertical axis 902, respectively, each of which extend through a mid-point on the vehicle's wheels. The horizontal axis 901 may run horizontally, such as parallel to the ground (or rather, the direction of gravity), and the vertical axis 902 may run vertically, such as the ground to the sky, although other orientations are also possible. The vehicle's pitch may be the amount of rotation around the horizontal axis 901, relative to a starting position, such as directly upwards from the ground towards the sky. The vehicle's yaw may be the amount of rotation of the vehicle relative to a vertical axis 902, relative to a starting point such as due east. The rotation amount may be determined from a point on the vehicle, such as on the vehicle's front bumper or any other portion of the vehicle.

The vehicle's plane may be calculated from a vector based on the vehicle's yaw and pitch. In this regard, the vehicle's yaw and pitch vector 910, as shown in FIG. 910, may be determined by rotating an initial vector from a default position by the vehicle's yaw and pitch amounts. For instance, the initial vector may be positioned straight upwards from the ground towards the sky. The initial vector may then be rotated by the vehicle's yaw and pitch amounts to generate the yaw and pitch vector 910. The vehicle's plane may be calculated by determining a plane normal to the yaw and pitch vector 910.

Figure 10:
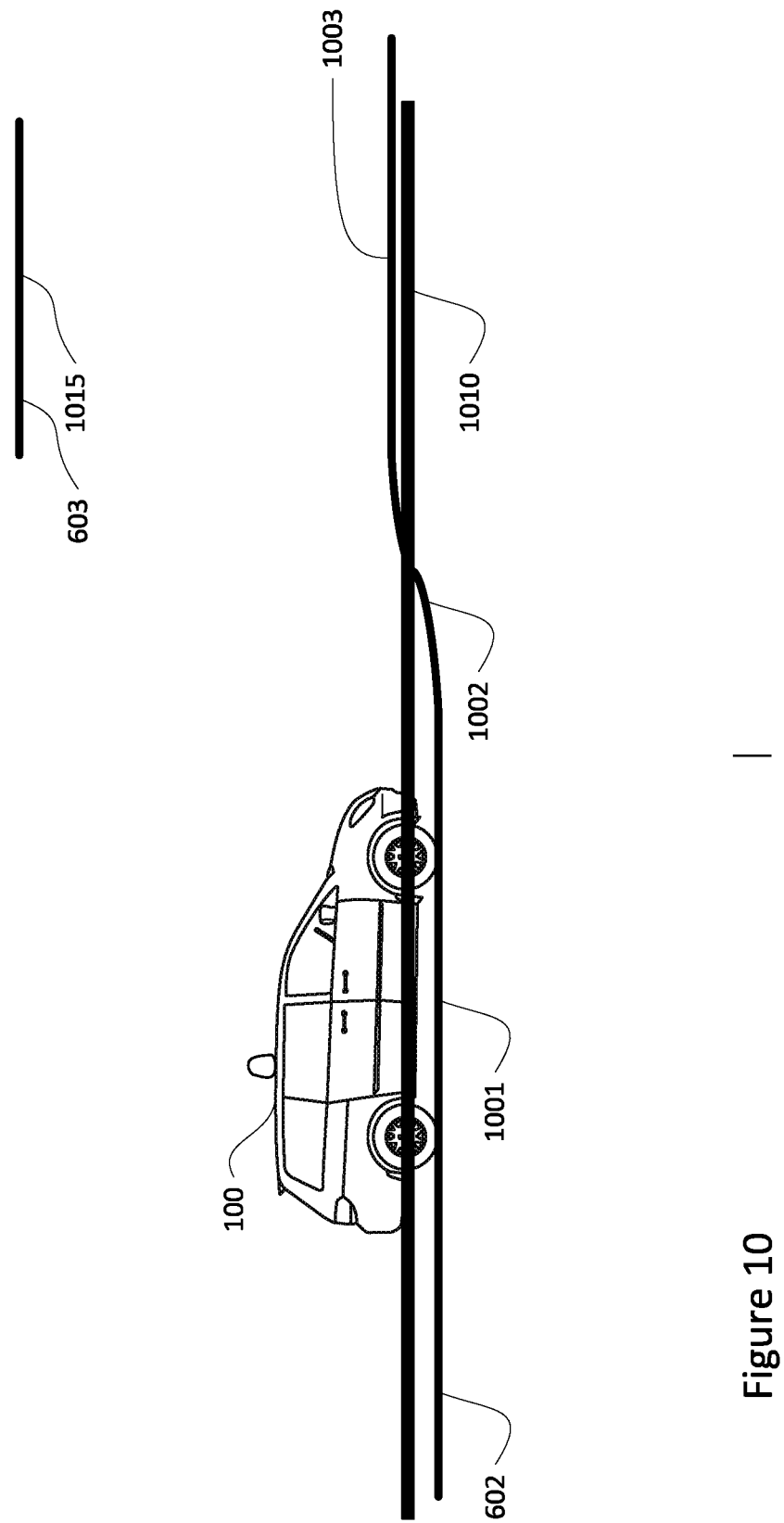
FIG. 10 is an illustration of a plane positioned relative to surrounding road in accordance with aspects of the disclosure.

The plane may be positioned on or near the vehicle or a portion of the road on which the vehicle is currently positioned. For instance, FIG. 10 illustrates a side view of vehicle 100 as it travels down road 602 and nears intersection 611, where road 603 passes above road 602. Road 602 may have a number of sections at different elevations, such as sections 1001, 1002, and 1003. FIG. 10 also illustrates road 603, including road portion 1015. The plane 1010, calculated as the plane normal to the yaw and pitch vector 910 may be positioned near road 602, at about the height of the mid-point of the vehicle's wheels. As such, portions of the road 602 are below the plane (i.e., 1001 and 1002), while other portions and roads are above the plane (i.e., 1003 and 603). Although FIG. 10 illustrates the plane 1010 as being positioned as running through the vehicle's wheels, the plane may be positioned anyway near the vehicle or road upon which the vehicle is travelling, such as below the tires at road 602 level, at the height of the vehicle's windshield, etc.

Figure 11:
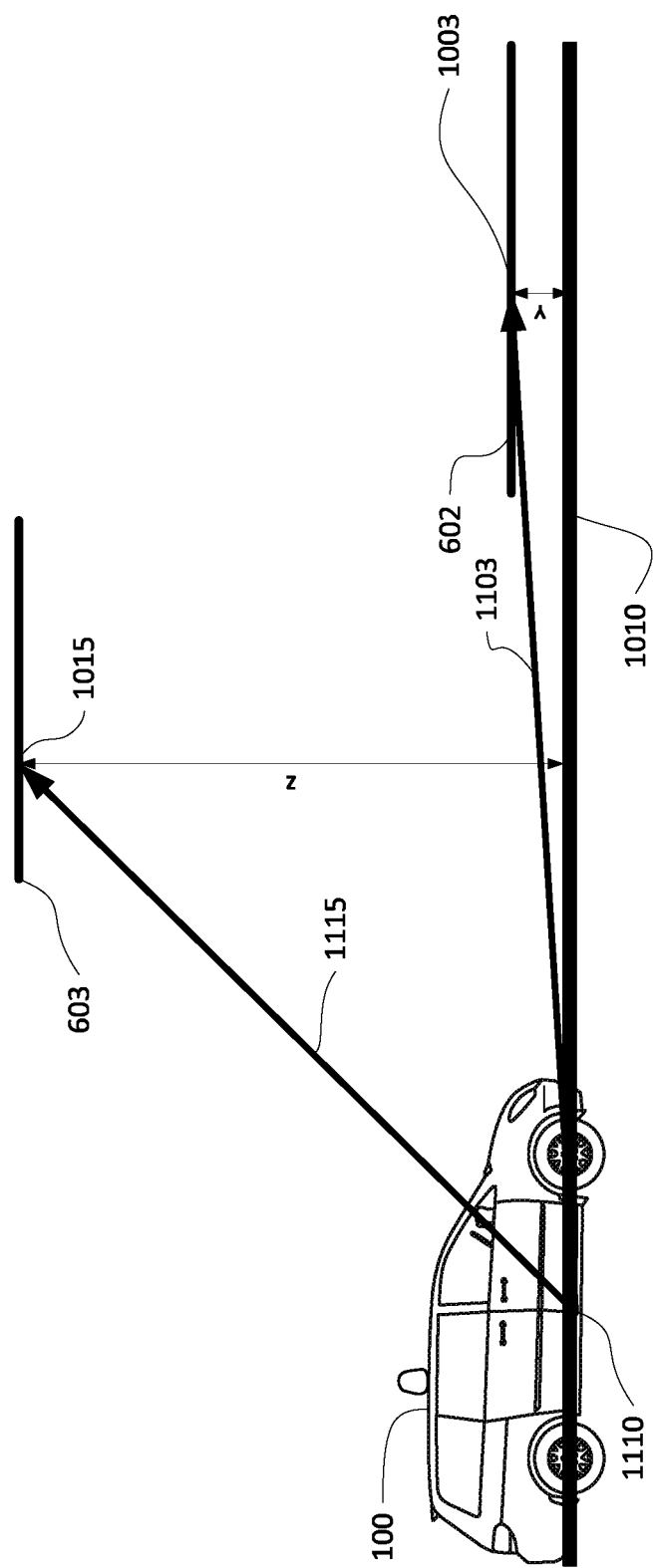
FIG. 11 is an illustration of distances between coordinates of road locations relative to a plane in accordance with aspects of the disclosure.

The video display system may take received coordinates of the road where the vehicle is positioned and the coordinates of roads at or near a point of intersection in order to determine distances of the respective coordinates from the plane. In this regard, vectors going from the vehicle's position to the respective coordinates of the road may be determined. For instance, at intersection 611, the video display system may generate vectors 1115 and 1103 from the vehicle's location 1110, such as the center of the vehicle's rear axle, or other such point, to the portions of each road 1015 and 1003, respectively, as illustrated in FIG. 11. A dot product between each of the vectors, 1115 and 1103, and a vector normal to the plane (i.e., the yaw and pitch vector 910) may be determined. The resulting products may be the distance between respective coordinates and the nearest point on the vehicle's plane 1010. In this regard, the dot product of vector 1115 and yaw and pitch vector 910 may be distance "Z" and the dot product of vector 1103 and yaw and pitch vector 910 may be distance "Y", as illustrated in FIG. 11. Although the distances for only coordinates 1015 and 1003 are shown in FIG. 11, distances for coordinates associated with portions 1001 and 1002 may also be found.

Figure 12:
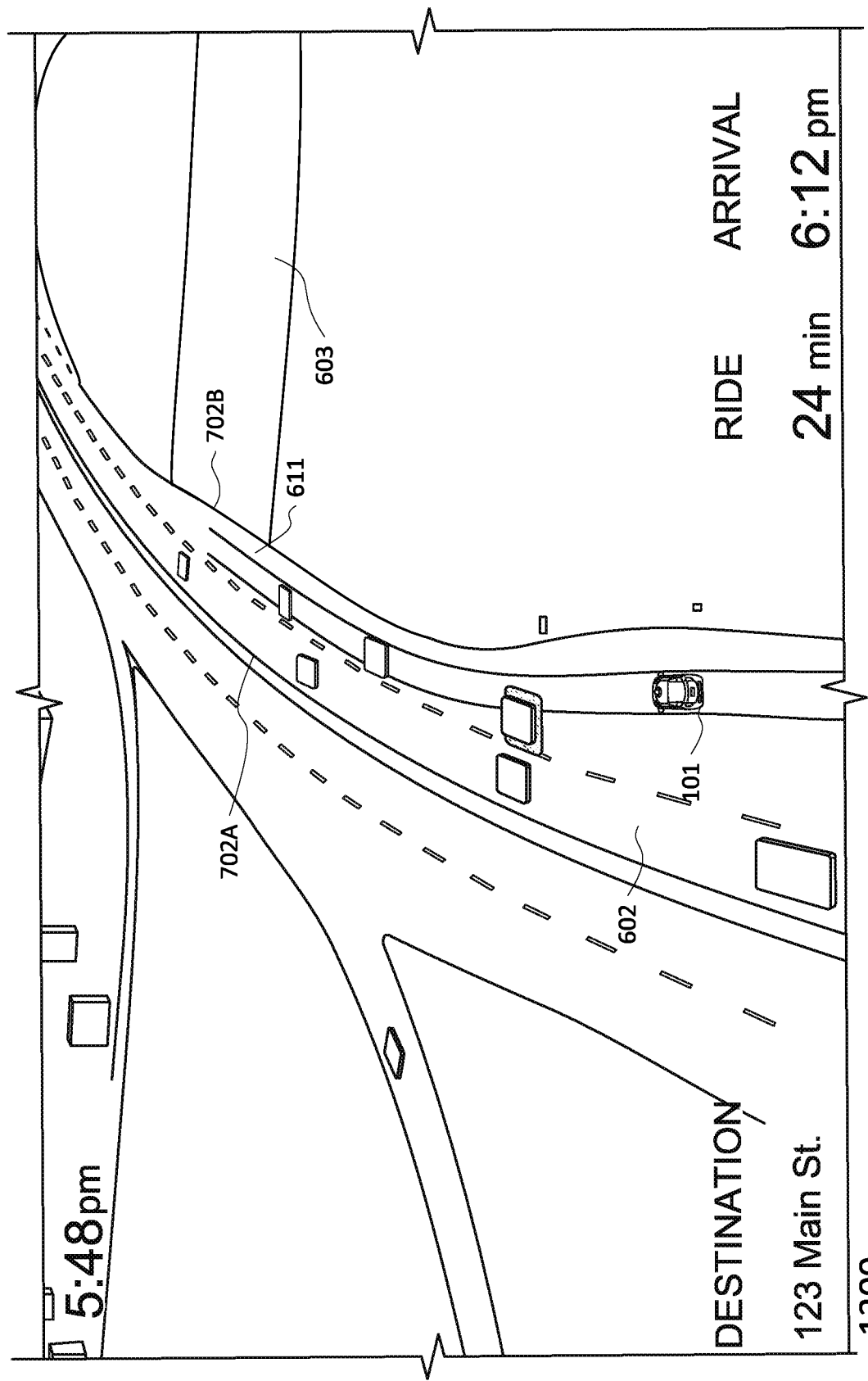
FIG. 12 is an illustration of a video frame showing a field of view of a virtual camera with portions of a road being removed in accordance with aspects of the disclosure.

Based on the calculated distance, the road closer to the vehicle's plane may be selected for display in the video and the more distant road may be faded or removed from the video at the point of intersection. For instance, distance "Z" may be 5 m and distance Y may be "2" meters. Thus, the portion of road 1003 may be displayed while portion of road 1015 is removed from display. An example of removing the portion of road 1015 at intersection 611 is shown in video frame 1200 of FIG. 12, with portions 702A and 702B being displayed, while portions 703A and 703B are removed, in comparison to FIG. 6. Although only two roads are used in the example, there may be many roads intersecting at one point, and distances to each road may be compared with the closest road to the vehicle's plane being displayed.

Figure 13A:
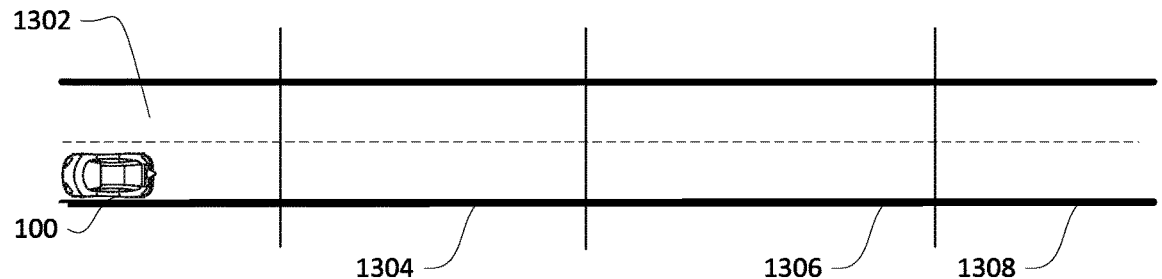
FIGS. 13A and 13B are illustrations of portioning a roadway having varying heights in accordance with aspects of the disclosure.

In some instances, the video display may selectively remove or not display roads, or portions of roads, from which are more than a predetermined threshold away from the vehicle's plane, regardless of whether the roads or portions of road cross over or under another road. In this regard, for every portion of a road, a determination of the distance of the respective portion of road from the plane may be determined. For example, as shown in FIG. 13A, road 1302, upon which vehicle 100 is travelling, may be sectioned into portions 1304, 1306, and 1308. Each section may be a predefined length, such as 5 m, or more or less.

Figure 13B:
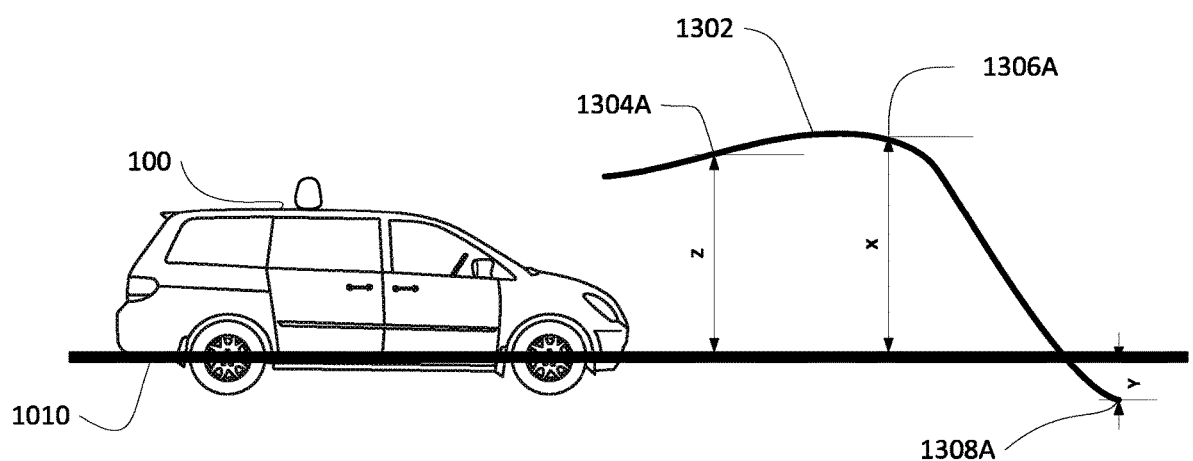

A coordinate for each portion of road may use to determine the distance of each portion of road from the vehicle's plane. For example, coordinates 1304A, 1306A, and 1308A may correspond to road portions 1304, 1306, and 1308, respectively, as shown in FIG. 13B. Each coordinate may be used to determine the distance the portions of road are from the vehicle's plane 1010, with section 1304 being "Z" distance, section 1306 being "X" distance, and 1308 being "Y" distance.

Portions of the road which are more than a predetermined threshold distance from the plane, such as 3 meters or more or less, may be removed from the video. For instance, distance "Z" of portion 1304 may be 2 m, distance "X" of portion 1306 may be 4 m, and distance "Y" of portion 1308 may be 0.5 m. As such, the video display system may only display portions 1304 and 1308, as their distance is less than the threshold of 3 meters, while not displaying portion 1306.

Although only one road is shown in FIGS. 13A and 13B, multiple roads may be portioned and selectively displayed. In some instances, the threshold may vary depending upon the distance between the coordinate of the road and the vehicle's location. In this regard, roads which are further from the vehicle's location may have a larger threshold, such as 5 meters, or more or less, than roads which are closer to the vehicle, or vice versa. In some instances, roads within a predefined distance of the threshold, such as 1 m, or more or less, from the threshold distance may be faded from the display, while portions further than the predefined distance may not be displayed at all. Moreover, road markings of portions of the road which are within the predefined distance of the threshold may be removed.

Figure 14:
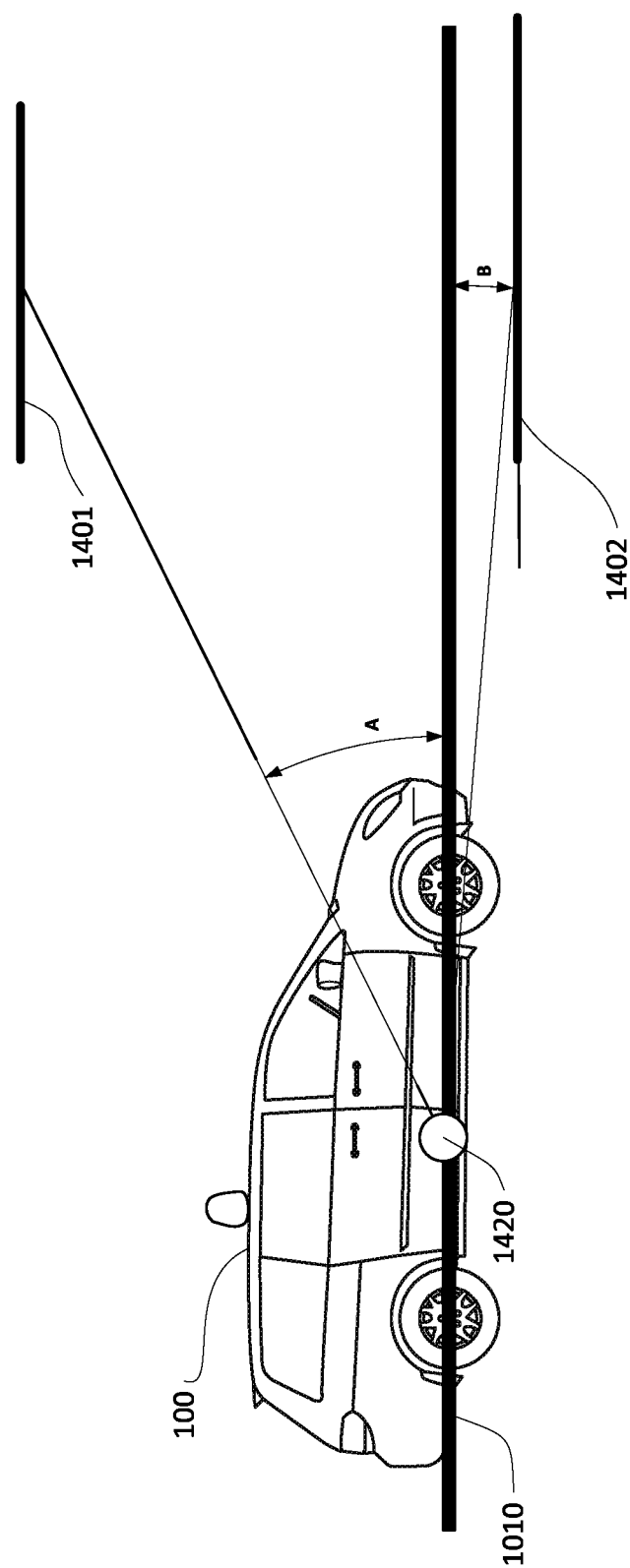
FIG. 14 is an illustration of angular displacement in accordance with aspects of the disclosure.

The distance between the vehicle's plane and coordinates of a road, may be calculated by angular displacement. In this regard, the video display system may calculate angles from a point on the plane at the vehicle's location to the respective coordinates of each road. The road or roads with coordinates associated with the smallest angles may be displayed in the video while the other roads may be faded out or removed from the video. For example, the point 1420 on the vehicle's plane 101 may be centered on the vehicle 100, as shown in FIG. 14. The vehicle display system may determine the angular distance between the vehicle's plane 1010 and the respective coordinates, 1401 and 1402, representing two different roads, as measured from point 1420. The angular distance "B" between point 1420 and coordinate 1402 is less than the angular distance "A" between point 1420 and coordinate 1401. As such, the vehicle display system may display the road corresponding to coordinate 1402.

As angular displacement is less susceptible to minor elevation changes of the vehicle, roads at the periphery of the video may subjected to calculations of distance via angular displacement and roads closer to the vehicle may be subjected to distance based on vector calculations as described above. Angular displacement may also be used to determine the distance of sections of road. In some instance, roads within a predetermined angular displacement threshold maybe displayed, while others are removed. For instance, all roads with angular displacements less than 5 degrees, or more or less, may be displayed while others may be removed.

Figure 15:
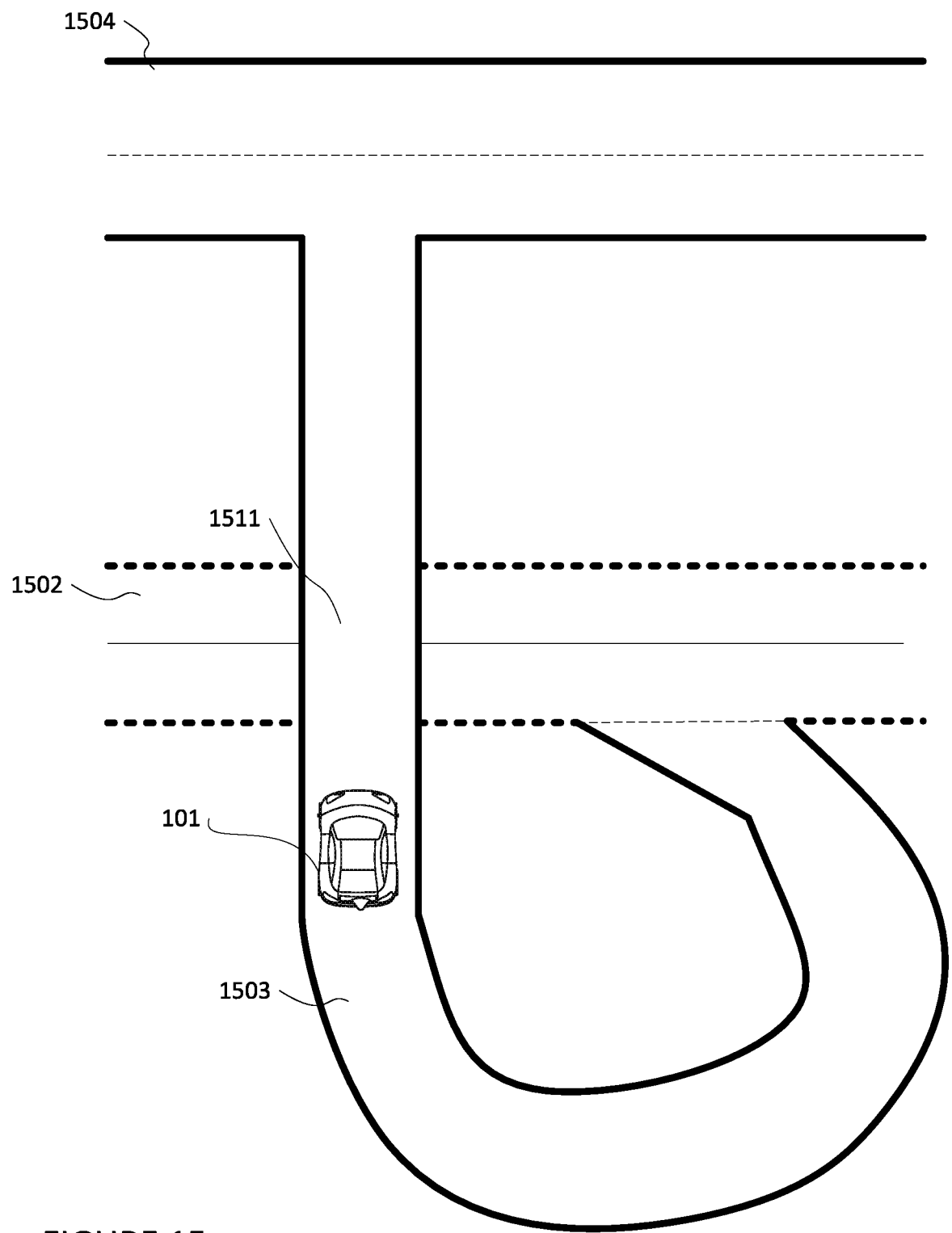
FIG. 15 is an illustration of selectively displaying roadways in accordance with aspects of the disclosure.

The determination of which roads to display in the video may be continually updated. In this regard, as the vehicle continues along its trajectory, the video display system may continually monitor the distance of surrounding roads relative to the plane of the vehicle. For instance, as shown in FIG. 15, as the virtual vehicle 101 travels around an elevated off ramp 1503 the road onto which the virtual vehicle 101 is travelling towards 1504 and portions of the off ramp 1503 may be displayed as portions of the off ramp 1502 and road 1504 fall within a predetermined threshold distance of the vehicle's plane. The road from which the virtual vehicle exited 1502 may fade from the display (illustrated by the dotted lines of road 1502) as the distance of the vehicle's plane relative to the road 1502 surpasses a predetermined threshold.

Figure 16:
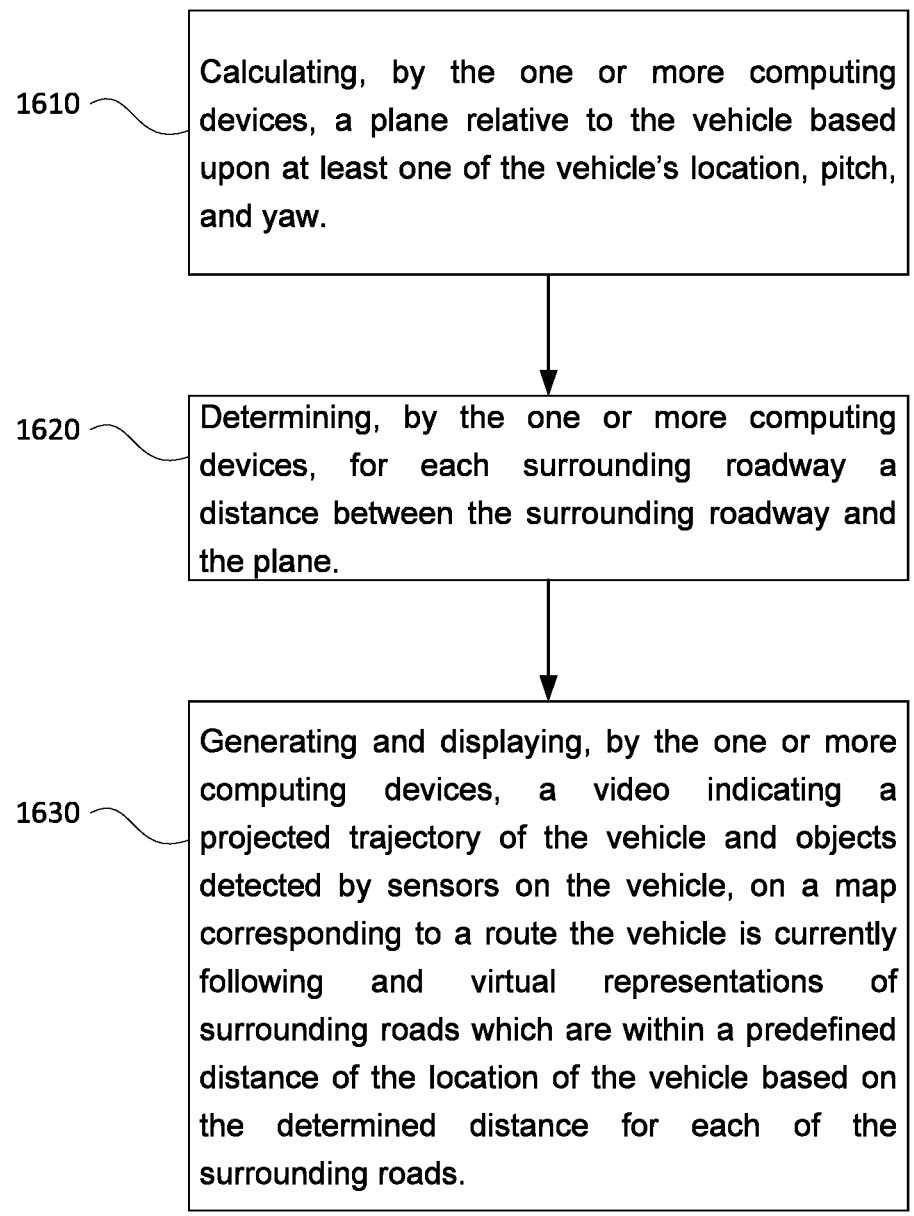
FIG. 16 is a flow diagram in accordance with aspects of the disclosure.

FIG. 16 is an example flow diagram 1600 which may be performed by one or more computing devices of a vehicle, such as computing device 110 of vehicle 100 in order to selectively provide details of surrounding roads to passengers of a vehicle. In this example, one or more computing devices may calculate a plane relative to an orientation of the vehicle based upon at least one of the vehicle's location, pitch, and yaw, as shown in block 1610. For each surrounding road a distance between the surrounding road and the plane may be determined by the one or more computing devices, as shown in block 1620. The one or more computing devices may generate and display a video indicating a projected trajectory of the vehicle and objects detected by sensors on the vehicle, on a map corresponding to a route the vehicle is currently following and virtual representations of surrounding roads which are within a predefined distance of the location of the vehicle based on the determined distance for each of the surrounding roads, as shown in block 1630.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A computer implemented method comprising:
   detecting, by one or more computing devices using one or more sensors, a plurality of road sections relative to a vehicle;
   determining, the one or more computing devices, for each road section of the plurality of road sections, an elevational distance between the vehicle and the road section; and
   generating for display, by the one or more computing devices, a video including a map corresponding to a route for the vehicle and virtual representations of one or more of the plurality of road sections based on a threshold elevational distance and the determined elevational distance for each road section.

2. The computer implemented method of claim 1, wherein generating for display the video includes generating a virtual representation of a given road section of the plurality of road sections in a frame of the video when the determined elevation distance for the given road section is less than the threshold elevational distance.

3. The computer implemented method of claim 2, wherein generating for display the video includes fading or removing from display the virtual representation of the given road section in one or more subsequent frames of the video as the determined elevation distance for the given road section changes relative to the vehicle and surpasses the threshold elevational distance.

4. The computer implemented method of claim 1, wherein the elevational distance between the vehicle and the road section is an angular distance between a plane positioned relative to the vehicle and the road section, and the threshold elevational distance is a threshold angular distance.

5. The computer implemented method of claim 4, wherein the plane is positioned at a height where the plane intersects wheels of the vehicle.

6. The computer implemented method of claim 1, wherein generating the video includes generating an indication of a projected trajectory of the vehicle on the map.

7. The computer implemented method of claim 1, wherein generating the video includes generating virtual representations of objects detected by the one or more sensors.

8. The computer implemented method of claim 1, wherein the threshold elevational distance varies based upon a distance between the road section to the vehicle.

9. A system for generating a video related to a vehicle, the system comprising one or more processors configured to:
  detect, using one or more sensors, a plurality of road sections relative to the vehicle;
  determine, for each road section of the plurality of road sections, an elevational distance between the vehicle and the road section; and
  generate for display a video including a map corresponding to a route for the vehicle and virtual representations of one or more of the plurality of road sections based on a threshold elevational distance and the determined elevational distance for each road section.

10. The system of claim 9, the one or more processors are configured to generate for display the video to include a virtual representation of a given road section of the plurality of road sections in a frame of the video when the determined elevation distance for the given road section is less than the threshold elevational distance.

11. The system of claim 10, wherein the one or more processors are configured to generate for display the video to include fading or removing from display the virtual representation of the given road section in one or more subsequent frames of the video as the determined elevation distance for the given road section changes relative to the vehicle and surpasses the threshold elevational distance.

12. The system of claim 9, wherein the elevational distance between the vehicle and the road section is an angular distance between a plane positioned relative to the vehicle and the road section, and the threshold elevational distance is a threshold angular distance.

13. The system of claim 12, wherein the plane is positioned at a height where the plane intersects wheels of the vehicle.

14. The system of claim 9, wherein the one or more processors are configured to generate the video to include an indication of a projected trajectory of the vehicle on the map.

15. The system of claim 9, wherein the one or more processors are configured to generate the video to include virtual representations of objects detected by the one or more sensors.

16. The system of claim 9, wherein the threshold elevational distance varies based upon a distance between the road section and the vehicle.

17. A non-transitory, computer readable medium including instructions that, when executed, cause one or more processors to perform a method, the method comprising:
  detecting, using one or more sensors, a plurality of road sections relative to a vehicle;
  determining, for each road section of the plurality of road sections, an elevational distance between the vehicle and the road section; and
  generating for display a video including a map corresponding to a route for the vehicle and virtual representations of one or more of the plurality of road sections based on a threshold elevational distance and the determined elevational distance for each road section.

18. The medium of claim 17, wherein generating for display the video includes generating a virtual representation of a given road section of the plurality of road sections in a frame of the video when the determined elevation distance for the given road section is less than the threshold elevational distance.

19. The medium of claim 18, wherein generating for display the video includes fading or removing from display the virtual representation of the given road section in one or more subsequent frames of the video as the determined elevation distance for the given road section changes relative to the vehicle and surpasses the threshold elevational distance.

20. The medium of claim 17, wherein the elevational distance between the vehicle and the road section is an angular distance between a plane positioned relative to the vehicle and the road section, and the threshold elevational distance is a threshold angular distance.

* * * * *